United States Patent
Ksiazek (10) Patent No.: US 6,597,765 B1
(45) Date of Patent: Jul. 22, 2003

(54) SYSTEM AND METHOD FOR MULTIPLE LANGUAGE ACCESS IN A TELEPHONE NETWORK

(75) Inventor: Paul D. Ksiazek, Hoffman Estates, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/105,932

(22) Filed: Jun. 26, 1998

Related U.S. Application Data (60) Provisional application No. 60/052,663, filed on Jul. 16, 1997.

(51) Int. Cl.[7] .......................... H04M 1/64; H04M 3/42; H04M 3/00
(52) U.S. Cl. ................ 379/88.06; 379/67.1; 379/88.19; 379/201.12; 379/242; 379/265.01; 379/265.12
(58) Field of Search ........................ 379/88.06, 88.18, 379/88.22, 90.01, 91.02, 93.07, 115, 119, 127, 142, 211, 214, 223, 242, 230, 248, 267, 188, 189, 91.01, 144, 145, 67.1, 88.03, 88.05, 88.07, 88.17, 88.19, 93.12, 115.03, 201.12, 214.01, 219, 243, 265.01, 265.12; 707/202, 204; 709/237

(56) References Cited

U.S. PATENT DOCUMENTS

| | | | | |
|---|---|---|---|---|
| 5,136,633 A | * | 8/1992 | Tejada et al. | 379/91.02 |
| 5,163,083 A | * | 11/1992 | Dowden et al. | 379/88 |
| 5,210,789 A | * | 5/1993 | Jeffus et al. | 379/127 |
| 5,353,335 A | * | 10/1994 | D'Urso et al. | 379/67.1 |
| 5,566,234 A | * | 10/1996 | Reed et al. | 379/188 |
| 5,586,175 A | * | 12/1996 | Hogan et al. | 379/112 |
| 5,594,791 A | * | 1/1997 | Szlam et al. | 379/265 |
| 5,703,935 A | * | 12/1997 | Raissyan et al. | 379/88.18 |
| 5,838,772 A | * | 11/1998 | Wilson et al. | 379/67 |
| 5,930,343 A | * | 7/1999 | Vasquez | 379/115 |
| 5,963,635 A | * | 10/1999 | Szlam et al. | 379/309 |
| 6,111,937 A | * | 8/2000 | Kuroiwa et al. | 379/88.06 |

* cited by examiner

Primary Examiner—Allan Hoosain (57) ABSTRACT

A telecommunications system including a public telephonic switching network interconnected with a telephonic network switch for routing calls from an initial telephonic unit to a destination telephonic unit. Telephonic calls are sent via the public telephonic switching network for receipt at the computer controlled telephonic network switch. The telephonic network switch has a central processing unit and an associated memory with an improved programmed operator services position system for assigning a language to the telephonic call such that the assigned language is an associated attribute for the telephonic call. Throughout the duration of the telephonic call, the call is identified to receive telephone operator services in the particular language assigned for the telephonic call.

14 Claims, 5 Drawing Sheets

SYSTEM AND METHOD FOR MULTIPLE LANGUAGE ACCESS IN A TELEPHONE NETWORK

CROSS REFERENCE TO RELATED APPLICATION

This application claims the benefit of U.S. Provisional Application, Ser. No. 60/052,663, filed Jul. 16, 1997, and entitled System and Method For Multiple Language Access In A Telephone Network.

TECHNICAL FIELD

This invention relates to telephonic networks, and more particularly, to telephonic networks having an operator services position system associated with a central office telephonic switch for handling telephonic calls of multiple languages.

BACKGROUND OF THE INVENTION

The world-wide proliferation of telephonic communication has increased the desirability of making multi-language operator services available to telephone subscribers. Telephonic computer networks have enabled such telephonic communication on a global basis. Both international and domestic telephone calls often require multi-language operator services. Accordingly, central office telephonic switches are often provided with an associated originating operator system to provide operator services to telephone subscribers.

Unfortunately, the multi-language requirements for subscribers associated with a particular telephonic switch do not always correspond to the foreign language resources available at the location of the originating switch. Thus, multi-language operator services are often available at remote operator service systems associated with other central office telephonic switches with the resources of the remote switch available to be used by service subscribers of the originating telephonic switch. Disadvantageously, however, when a call is transferred from an originating telephonic switch to an alternate switch, the alternate switch must be functionally enabled to handle all the features that would apply to the originating call. Such a requirement results in substantial network architecture costs. Therefore, there is a need in the art to provide multi-language operator services through alternate telephonic switches without requiring the alternate switch to handle all the functional features associated with the originating call.

Additionally, to provide multiple language services, a long distance carrier is required to purchase multiple systems and provision them individually for the particular languages. This results in the purchase of many different configured systems at a significant cost to provide multi-language systems. Moreover, the language selected for telephone operator services in such known systems is based solely on the called service access telephone number. The language for operator service, disadvantageously, is not an assigned attribute of the telephonic call, and thus, such systems assume that a call is to be serviced in a particular language. The inflexibility of known operator service systems can prove to be an annoyance to the calling party, especially if the call is subsequently transferred to different telephonic switches.

SUMMARY OF THE INVENTION

The above problems are solved, and a technical advance is achieved in the art by retaining functionality at the originating telephonic network switch with the handling of calls at alternate telephonic switches being done transparently with respect to the originating subscriber. In accordance with the present invention, an improved operator services position system associated with a computer controlled telephonic network switch assigns a particular language to a received telephonic call and the assigned language is associated with and is an identifiable attribute of the telephonic call. Telephone operator services are enabled to be provided in the assigned language throughout the duration of the call. To facilitate the improved multi-language operator services, the functionality and call handling processing for a telephonic call is maintained at its originating telephonic switch. Additionally, telephone operator services in a particular language may be selectively provided by enabling interflow communication of the call at the originating telephonic switch with a remote telephonic switch having telephone operators versed in the desired language for the call. Maintaining the call and its functionality at the originating switch while still providing operator services in the appropriate language allows multi-language operator services to be decentralized on a network basis.

BRIEF DESCRIPTION OF THE DRAWINGS

The foregoing advantageous features of the invention will be explained in greater detail and others will be made apparent from the detailed description of the preferred embodiment of the present invention which is given with reference to the several figures of the drawing, in which.

DETAILED DESCRIPTION

Figure 1:
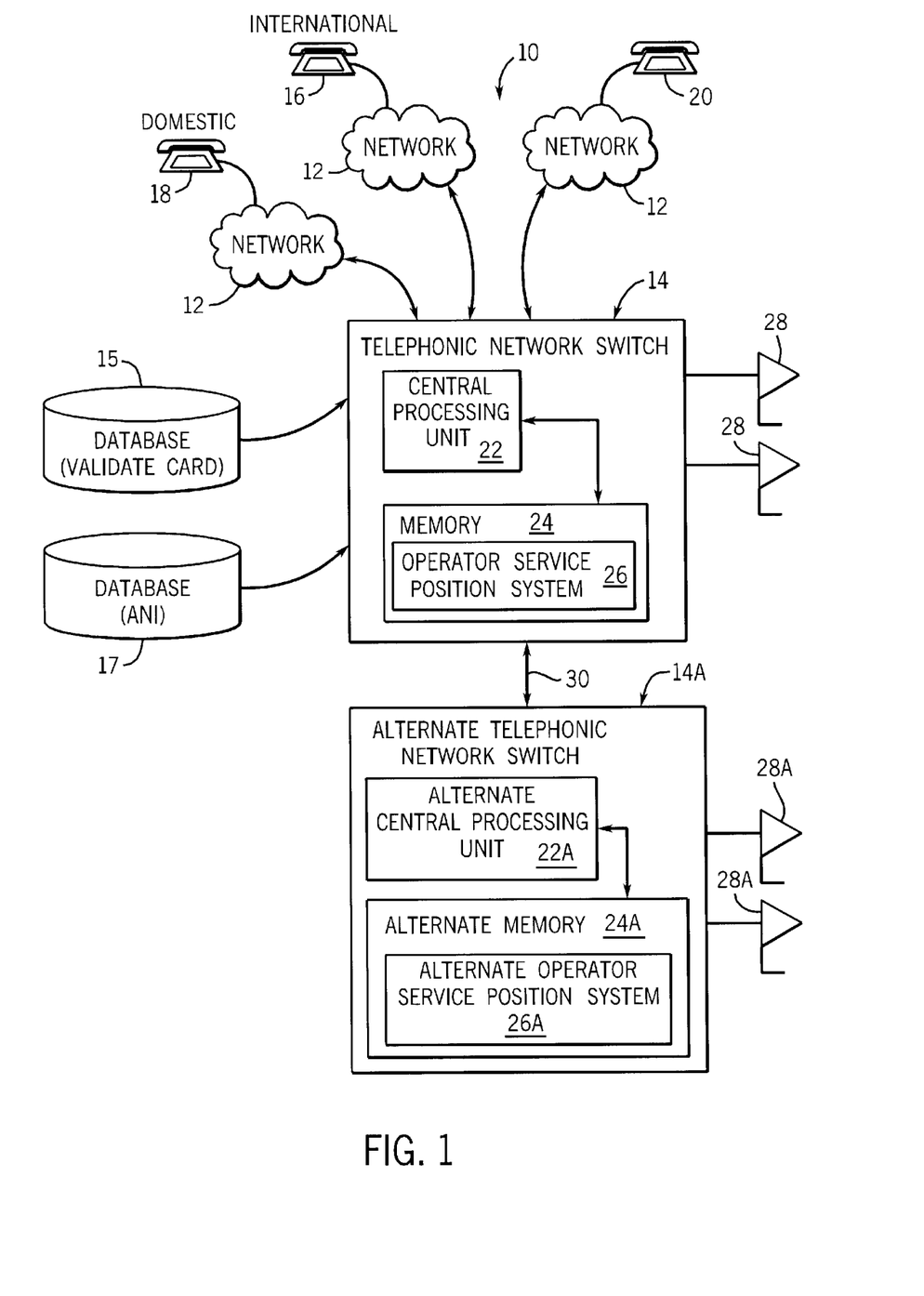
FIG. 1 is a block diagram of the telecommunications system with a telephone network constructed in accordance with the present invention.

Referring now to FIG. 1, telecommunication system 10 is shown having a public telephonic switching network 12 coupled with a telephonic network switch 14 of the present invention. Telephonic calls are made from initial telephonic units 16, 18 and are routed via the public telephonic switching network 14 for receipt at the telephonic network switch 14. The initial telephonic unit may selectively be either an international telephonic unit 16 from which an international call is made or a domestic telephonic unit 18 from which a domestic call is made for receipt at the switch 14. However, any type of telephonic unit which is capable of initiating a telephone call through the telephonic switching network 12 may be selectively employed as an initial telephonic unit. The telephonic call is subsequently routed by the telephonic network switch 14 via the network 12 to the appropriate destination telephonic unit 20 for communication with the initial telephonic unit 16, 18.

As seen in FIG. 1, the computer controlled telephonic network switch 14 has a central processing unit 22 with an associated memory 24 for carrying out various tasks at the telephonic network switch 14. An originating operator services position system (OSPS) 26 is further provided in memory 24 storage at the telephonic network switch 14 in which the operation and functionality of the improved OSPS 26 is described in greater detail below. The steps for carrying out the tasks performed by the computer controlled telephonic network switch 14 are preferably stored as encoded instructions in the memory device 24 wherein the contents of the memory 24 including the programmed OSPS 26 are examined by the processor 22 which interprets them to carry out actions using its own internal machinery, devices and functions. The telephonic network switch 14 preferably used is a 5ESS® switch of Lucent Technologies of Murray Hill, N.J., however, other suitable telephonic switches for transmitting of voice and/or data information through the public telephonic switching network 12 may alternatively be employed.

A card validation data base 15 is seen coupled to the telephonic network switch 14 for storing calling card validation information and providing such information to the telephonic network switch 14 as needed. Additionally, an Automatic Number Identification (ANI) database 17 is shown coupled to the telephonic network switch 14 for providing ANI information to be used by the telephonic network switch 14 upon receipt of an incoming telephonic call. Telephone operator units 28 are coupled with the telephonic network switch 14 for communicating telephone operator services appropriate to the telephonic call received at the telephonic network switch 14.

Once an initial telephonic call is received at the telephonic network switch 14 the OSPS 26 of the computer controlled switch assigns a language to the telephonic call. Preferably, the assigned language is an associated attribute for the telephonic call and the call is marked in the call record to receive operator services in the particular assigned language. As an attribute of the call, the assigned language is a persistent identifiable piece of data or information in memory which is related to and determines the behavioral aspects of the call. Preferably, the language assigned to the telephonic call is selectively determined by the telephonic network switch 14 in response to receiving at least one of either: (a) a dialed telephonic number for the telephonic call, (b) a country code of the telephonic call, (c) a card billing number entered by a user making the telephonic call, (d) ANI information, or (e) caller input information. The OSPS 26 of the telephonic network switch 14 is selectively responsive to either two or more of (a)–(e) above or to each one individually. For example, the caller at an initiating telephonic unit 16, 18 enters a card billing number the OSPS 26 will access card validation database 15 to enable validation of the card and to identify the assigned operator language services. Similarly, if ANI information is received with the incoming telephonic call at the telephonic network switch 14, the OSPS 26 in conjunction with the multiport switch will access the ANI database 17 to determine the appropriate assigned operator language services for the call. The term language when referring to the language of telephone operator services is used in a broad sense referring not only to the natural language spoken by the telephone operators but also applying to variation of treatment given to a caller in a same natural language. Such variations include, but are not limited to differentiation of the voice of a speaker providing operator service announcements, wording, intonation, branding or operator treatment.

The telephonic call is then identified to receive operator services in the assigned language. The identification of the assigned language for telephone operator service is preferably maintained throughout the duration of the call. A language is assigned to the call record which is a piece of data associated with the call. The language value may be selectively changed from what is stored in the call record. Preferably, the central processing unit, a computer device 22 of the telephonic network switch 14, automatically assigns a default language for the telephone operator services to the telephonic call received at the telephonic network switch 14. The caller or user at the initial international telephonic unit 16 or initial domestic telephonic unit 18 is selectively provided a language access code prompt received from the telephonic network switch 14 to enable the user to selectively change the assigned default language for the telephonic call. For example, the prompt may ask the user, "To change the assigned language for telephone operator services, please select the language you wish to use. Press *71 for English, press *72 for Spanish, press *73 for French, etc." Any suitable prompt to initiate the caller to selectively choose a desired language for operator services may be employed. Preferably, the language access code prompt is in the form of an automated voice message played to the user at the initial telephonic unit.

In response to the telephonic network switch 14 receiving the telephonic call, the OSPS 26 of the telephonic network switch 14 determines whether the telephonic call is to receive an automated recorded operator service announcement or a live telephone operator voice communication. Once the OSPS 26 makes this determination, the telephonic network switch 14 transmits in the language assigned for the telephonic call either an automated recorded operator service announcement to the user at the initial telephonic unit 16, 18 or live telephone operator voice communication to provide operator services. In response to the determination that the telephonic call is to receive automated handling, the OSPS 26 of the telephonic network switch 14 automatically sends prerecorded voice messages to the caller to service the call in an automated fashion and in the correctly assigned language for the call. Furthermore, if the OSPS 26 determines that the telephonic call is to receive live operator handling, the telephonic call is routed to an operator telephonic unit 28 at which a human telephone operator is stationed to provide live telephone operator services for the telephonic call in the assigned language.

Once the language is determined at the telephonic network switch 14 for providing operator services to the call, the programmed OSPS 26 further determines the availability of operator language resources at the telephonic network switch 14 for the particularly assigned language determined to be needed for the telephonic call. If the telephonic network switch 14 does not have the operator language resources for the assigned language of the telephonic call, all the functionality for the telephonic call will remain at the telephonic network switch 14, however, the telephonic call will be interflowed to an alternate telephonic network switch 14A to provide a voice connection to the call via an overflow path 30. As seen in FIG. 1, the alternate telephonic network switch 14A also has an associated central processing unit 22A, memory 24A, and an OSPS 26A to provide operator services for the telephonic call in one or more pre-assigned languages. The telephonic network switch 14 will select an alternate telephonic network switch 14A that has the operator language resources required for the assigned language of the telephonic call. As seen in FIG. 1, the alternate telephonic network switch 14A also preferably has a plurality of operator telephonic units 28A at which telephone operators are enabled to provide services of one or more languages. The alternate telephonic network 14A may selectively associate different languages with different operator telephonic units 28A.

Once it has been determined that the telephonic network switch 14 does not have available the operator language resources for the assigned language of the telephonic call, the alternate telephonic network switch 14A having the operator language resources required for the call coupled with the telephonic network switch 14 provides telephone operator services for the call in the appropriate language.

The telephone operator services in the matching assigned language which are provided via the alternate telephonic network switch 14A may selectively be provided in an automated fashion or by live telephone operator communication. If live telephone operator services are provided then the alternate telephonic network switch 14A preferably makes a connection with one of its associated operator telephonic units 28A to enable the call to be serviced in the assigned language. The telephonic call is interflowed along overflow path 30 between the telephonic network switch 14 and the alternate telephonic network switch 14A.

Even though a voice connection between the telephonic network switches 14, 14A is established over the overflow path 30 to enable transmission of the operator services in the assigned language to the initial calling telephonic unit 16, 18 all call control information is preferably maintained at the originating telephonic network switch 14. Advantageously, telephone operator services in the desired language for the telephonic call may selectively be provided via a remote alternate telephonic network switch 14A without requiring the alternate telephonic network switch 14A to have all the service functionality required of the telephonic call. In these circumstances, the alternate telephonic network switch 14A at a remote location provides the required operator services while service functionality for the telephonic call is retained at the originating telephonic network switch 14. Preferably, all the service functionality associated with call connection is retained at the originating switch 14. The functionality for a telephonic call refers to telephone services and capabilities that are selectively applied to a call. This includes but is not limited to alternate billing (card billing, collect billing, third person billing), person of class charge, directory assistance, call information, rate information, trouble reporting, time-of-day and the like.

Upon the telephonic call receiving the required operator service in the desired language, the originating telephonic network switch 14 identifies the appropriate destination telephonic unit 20 to receive the telephonic call and the switch 14 routes the call to the identified destination telephonic unit 20.

The telecommunication system 10 of FIG. 1 is not limited to a single alternate telephonic network switch 14A, but rather a plurality of alternate telephonic network switches 14A selectively provided to furnish telephone operator services in many languages. The telecommunication system 10 may be selectively provisioned such that operator telephonic units 28, 28A are coupled to each of the plurality of alternate telephonic network switches 14A. The system 10 may be selectively provisioned such that a particular single language for which telephone operator services are to be provided is assigned at each of the different alternate telephonic network switches 14A.

Alternatively, the telephonic network switch 14 may be selectively provisioned to have it coupled with a plurality of operator telephonic units 28 with different telephone operator services in different languages associated with and provided by certain ones of the different operator telephonic units 28 at the telephonic network switch 14.

Referring now to FIGS. 2A–2D, the processing steps that are performed to establish integrated access to multiple language capabilities for telephonic calls are shown. FIGS. 2A–2D illustrate a composite flow chart for the preferred computer program of the operator services position system at the telephonic network switches of the telecommunication system.

Figure 2A:
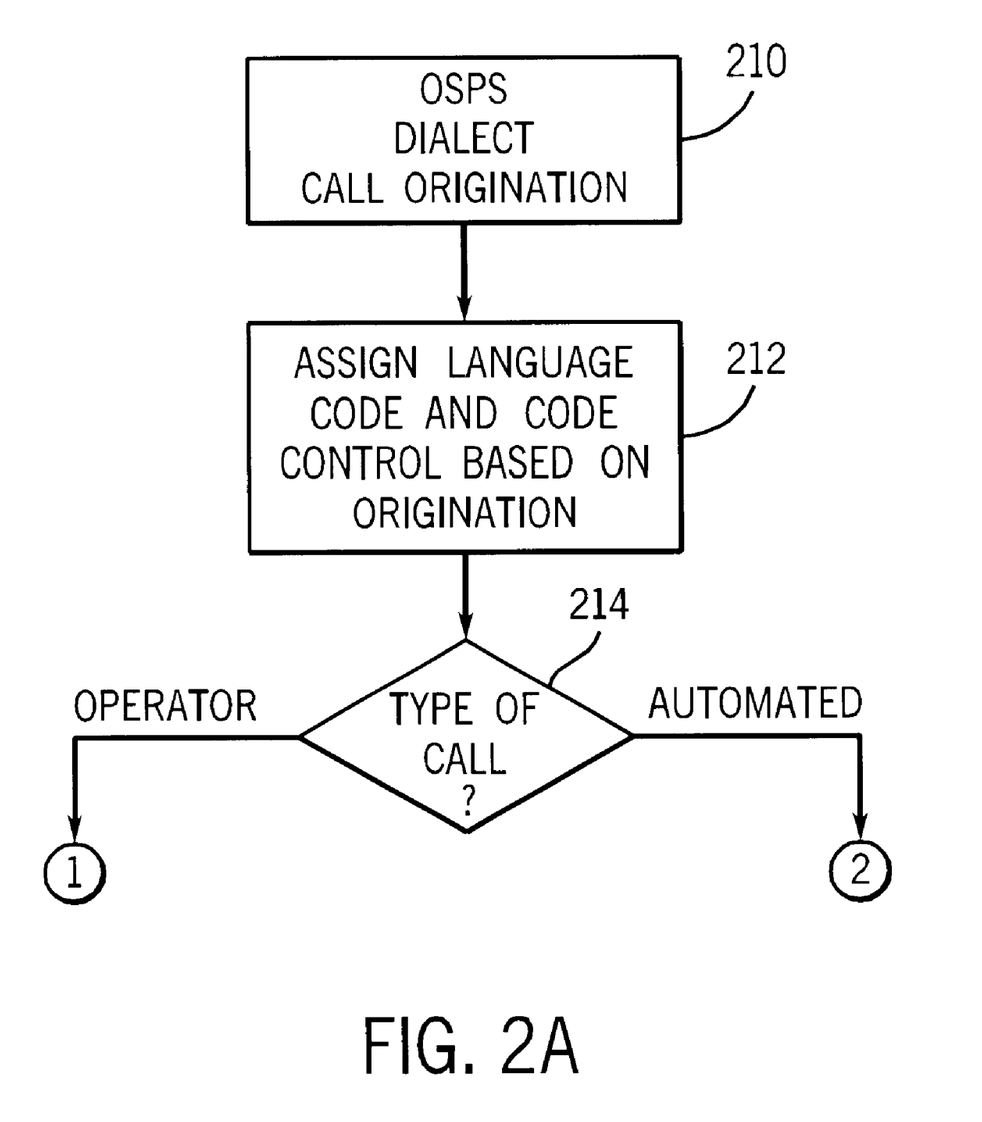
FIGS. 2A–2D are flow charts illustrating the steps performed to provide multiple language access in the telephone network in accordance with the present invention.

Referring to FIG. 2A, in step 210 a telephonic call originates from either an international telephonic unit 16, FIG. 1, or a domestic telephonic unit 18, FIG. 1. The telephonic call is received at a telephonic network switch 14, FIG. 1. The telephonic network switch 14, identifies the origination of the telephonic call preferably through received call origination identification information which is received at the operator services position system (OSPS) 26, FIG. 1, at the associated switch memory 24. The OSPS 26 by examining the call record data associated with the call recognizes that the telephonic call is a direct integrated access to language enhanced capabilities (DIALECT) call. If the call is determined to be a DIALECT call, it is identified as having language services. In step 212, FIG. 2A, the OSPS 26 automatically assigns a language code to the telephonic call based upon the origin of the telephonic call. Language Code refers to a system code associated with a language or service. Code control refers to the ability for callers to enter a language access code. The caller or user at the initial international telephonic unit 16 or the initial domestic telephonic unit 18 may selectively be provided with a language access code prompt if the call is provided with automated handling to selectively change the assigned language by entering a language access code. In step 214, FIG. 2A, the OSPS 26 in conjunction with the computer device 22, FIG. 1, of the telephonic network switch 14 determines whether the telephonic call is to receive live telephone operator voice communications or automated operator service handling.

Figure 2B:
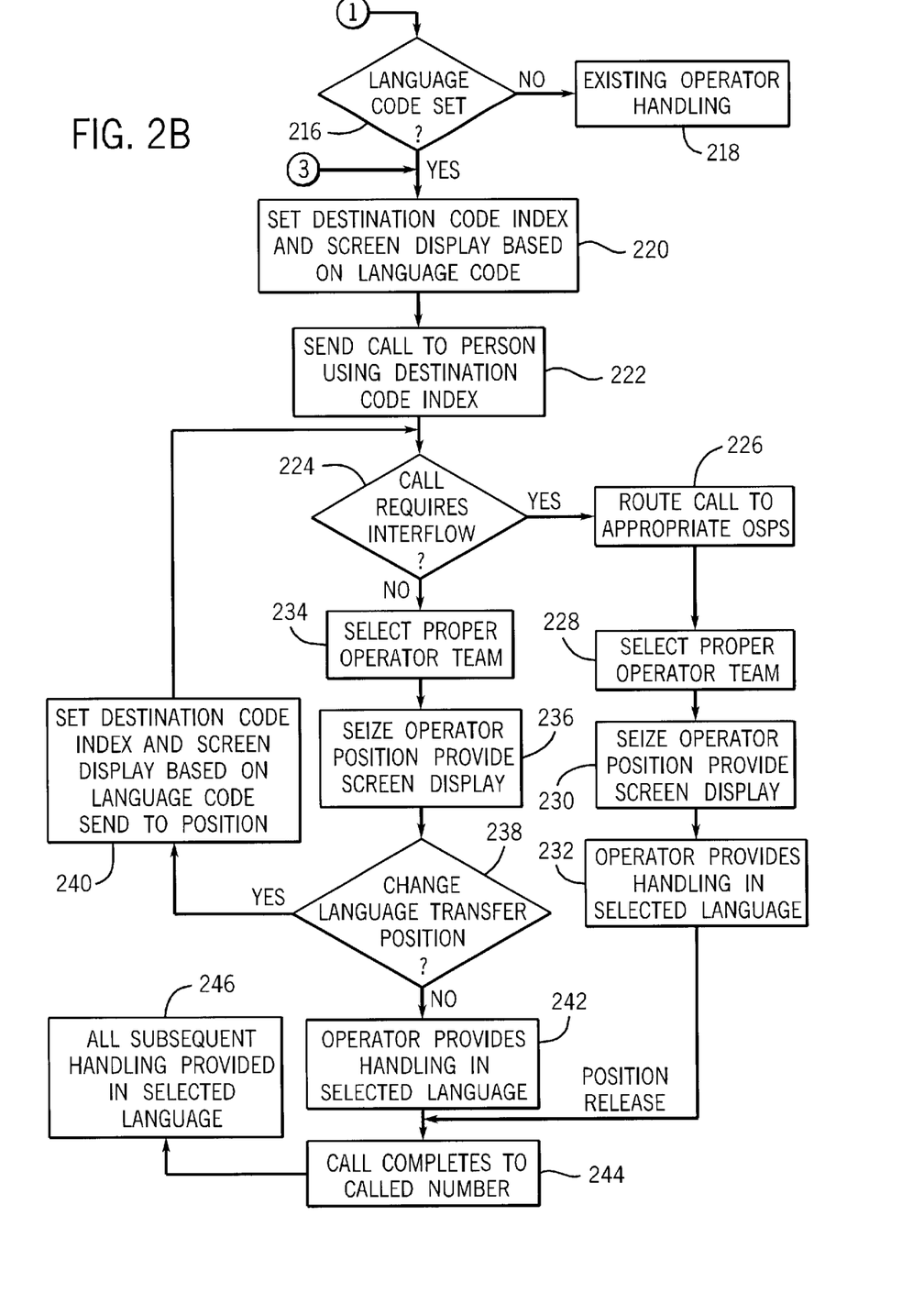

If the OSPS 26 determines that the telephonic call is to receive live telephone operator voice communication, then in step 216, FIG. 2B, the OSPS 26 determines whether a language code of a corresponding language has been set. In step 218, FIG. 2B, if the language code has not been set then the telephonic call is routed to an operator telephonic unit 28, FIG. 1, to receive live telephone operator service in the assigned default language.

In step 220, FIG. 2B, if a language code is set then the OSPS 26 sets the destination code index and the screen display text at the operator telephonic unit 28 for the telephonic call based upon the language code. The display screen terminal (not shown) at the operator unit 28 may selectively display the word English, French, German, Spanish, etc. to identify the appropriate language to the operator. The language code is pre-set in step 212 and the destination code index is a pointer in memory to a group of operators. In step 222, FIG. 2B, the OSPS 26 routes the telephonic call to an operator telephonic unit 28 position based upon the destination code index. In step 224, FIG. 2B, the OSPS 26 at the originating telephonic network switch 14 determines whether the telephonic network switch 14 has the operator language resources for the assigned language of the telephonic call. If the telephonic network switch 14 does not have the language resources for the assigned language, the functionality for the telephonic call will remain at the telephonic network switch 14, however, the telephonic call is interflowed to an alternate telephonic network switch 14A, FIG. 1, to provide live operator services.

In step 226, FIG. 2B, the telephonic call is routed to an alternate telephonic network switch 14A, FIG. 1, that has the appropriate operator language resources for the assigned language. In step 228, FIG. 2B, the OSPS 26A at the alternate telephonic network switch 14A, FIG. 1, selects an operator telephonic unit 28A of a pre-determined operator team that has the appropriate operator language resources for the assigned language. In step 230, FIG. 2B, the OSPS 26A, FIG. 1, seizes the position of the operator telephonic unit 28A that has the operator language resources for the assigned language and provides the appropriate information concerning the call at the display screen terminal (not shown) of the selected operator telephonic unit 28A. In step 232, FIG. 2B, an operator services the telephonic call in the assigned language. After the operator has handled the telephonic call in the assigned language, the telephonic network switch 14 releases the position of the alternative telephonic network switch 14A. In step 244, FIG. 2B, the telephonic network switch 14 routes the telephonic call to the identified destination telephonic unit 20, FIG. 1, and the call completes to the called number. Step 246, FIG. 2B, the OSPS 26 marks the call to be serviced in the appropriate language such that all subsequent operator services of the telephonic call is handled in the assigned language. The assigned language for operator services is an assigned attribute of the call itself.

Referring back again to step 224, FIG. 2B, if the telephonic network switch 14 has the language resources for the assigned language and the call does not require interflow then in step 234, FIG. 2B, the OSPS 26 selects an operator telephonic unit 28 of a proper operator team that has the operator language resources for the assigned language. In step 236, FIG. 2B, the OSPS 26 of the telephonic network switch 14 seizes the position of the operator telephonic unit 28 that has the operator language resources for the assigned language and provides an appropriate screen display relating to the call.

In step 238, FIG. 2B, the OSPS 26 determines whether the user has requested to change the assigned language of the telephonic call and has entered a new language code. If a change in language transfer position is needed, then in step 240, FIG. 2B, the OSPS 26 sets the destination code index and the screen display for the telephonic call based upon the language code that was entered by the user. The telephonic network switch 14 in turn routes the telephonic call for transfer to another operator telephonic unit 28 position based upon the destination code index. The telephonic call is routed and the processing returns to step 224, FIG. 2B for determination of the need to interflow the call.

Referring back again to step 238, FIG. 2B, if it is determined that no language change is required and no transfer of operator position is needed then in step 242, FIG. 2B, the telephone operator services the telephonic call in the assigned language. After the telephone operator handles the call in the assigned language, step 244, FIG. 2B, the OSPS 26 of the telephonic network switch 14 identifies the call to be serviced for all subsequent handling of the call in the appropriate selected and assigned language for the call. All subsequent handling of the telephonic call is serviced in the assigned language such that the identified operator language service is an attribute of the particular call. Referring back again to step 214, FIG. 2A, if the OSPS 26 determined that the telephonic call was to receive automated handling then in step 248, FIG. 2C, the OSPS 26 determines whether the language code has been set. In step 249, FIG. 2C, if a language code has not been set then the telephonic call is routed to an operator telephonic unit 28 at the telephonic network switch 14 to provide existing automated handling and the call receives an automated recorded operator service announcement in the assigned default language.

Figure 2C:
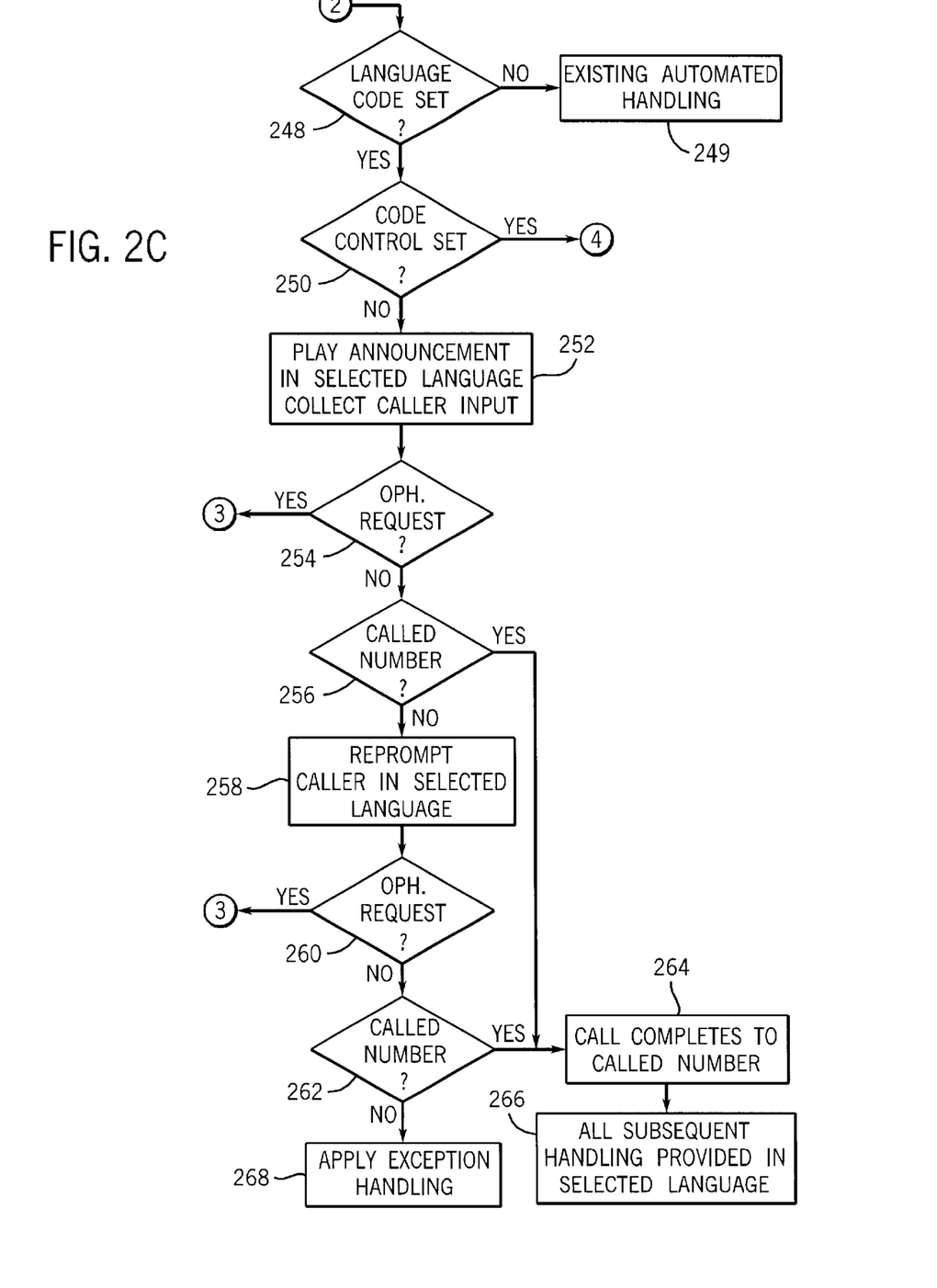

Referring now to step 248, FIG. 2C, if the language code has been set, then in step 250, FIG. 2C, the OSPS 26 determines whether the code control has been set. If the code control has not been set, then in step 252, FIG. 2C, an automated recorded operator service announcement is made in the assigned language, and the OSPS 26 collects information input by the user. For example, the caller may selectively enter a language access code, the called number, 0 for the operator and the like, as inputted information. In step 254, FIG. 2C, the OSPS 26 determines whether the caller has requested live operator handling based on the received information inputted by the caller. If the user or caller requested live operator handling, then the processing proceeds to step 220, FIG. 2B, for live operator call handling. However, if the user did not request live operator handling, then in step 256, FIG. 2C, the OSPS 26 determines whether an acceptable telephone number of an actual destination telephonic unit 20 has been dialed. In evaluating the called number, the OSPS 26 determines if the caller has entered an acceptable called number into the system. If the telephone number has been called, then in step 264, FIG. 2C, the telephonic call is completed to the called number and is routed to the identified destination telephonic unit 20. When the call completes to the called number, call billing verification is accomplished and access to additional operator services described herein is provided. In step 266, FIG. 2C, the call is identified as receiving telephone operator services in a particular language such that all subsequent operator handling of the telephonic call is serviced in the assigned language.

Referring now to step 256, FIG. 2C, if the OSPS 26 determines that the called telephone number of the destination telephonic unit 20 has not been provided, then in step 258, FIG. 2C, an automated recorded operator service announcement is replayed in the assigned language. For example, a prompt message such as "Please enter the number you are calling now" may selectively be played. In step 260, FIG. 2C, the OSPS 26 determines whether the user has selected to receive live operator handling. If the user requested live operator handling, then the processing returns to step 220, FIG. 2B, to initiate the steps for live operator call handling. If the user did not request live operator handling, then in step 262, FIG. 2C, the OSPS 26 determines whether a telephone number of a particular destination telephonic unit 20 has been called. If the telephone number has been called, then in step 264, FIG. 2C, the telephonic call is routed to the identified destination telephonic unit 20 and the call is completed. As seen in step 266, FIG. 2C, the call is identified to receive all subsequent telephone operator handling in the selected and assigned language. However, if in step 262, FIG. 2C, the telephone number of the destination telephonic unit 20 has not been entered then in step 268, FIG. 2C, exception handling is applied to the telephonic call. Exception handling may selectively include playing of an automated message to reprompt the caller, a reorder signal may be transmitted (hang-up) or the call could be selectively sent to an appropriate operator position for handling.

Figure 2D:
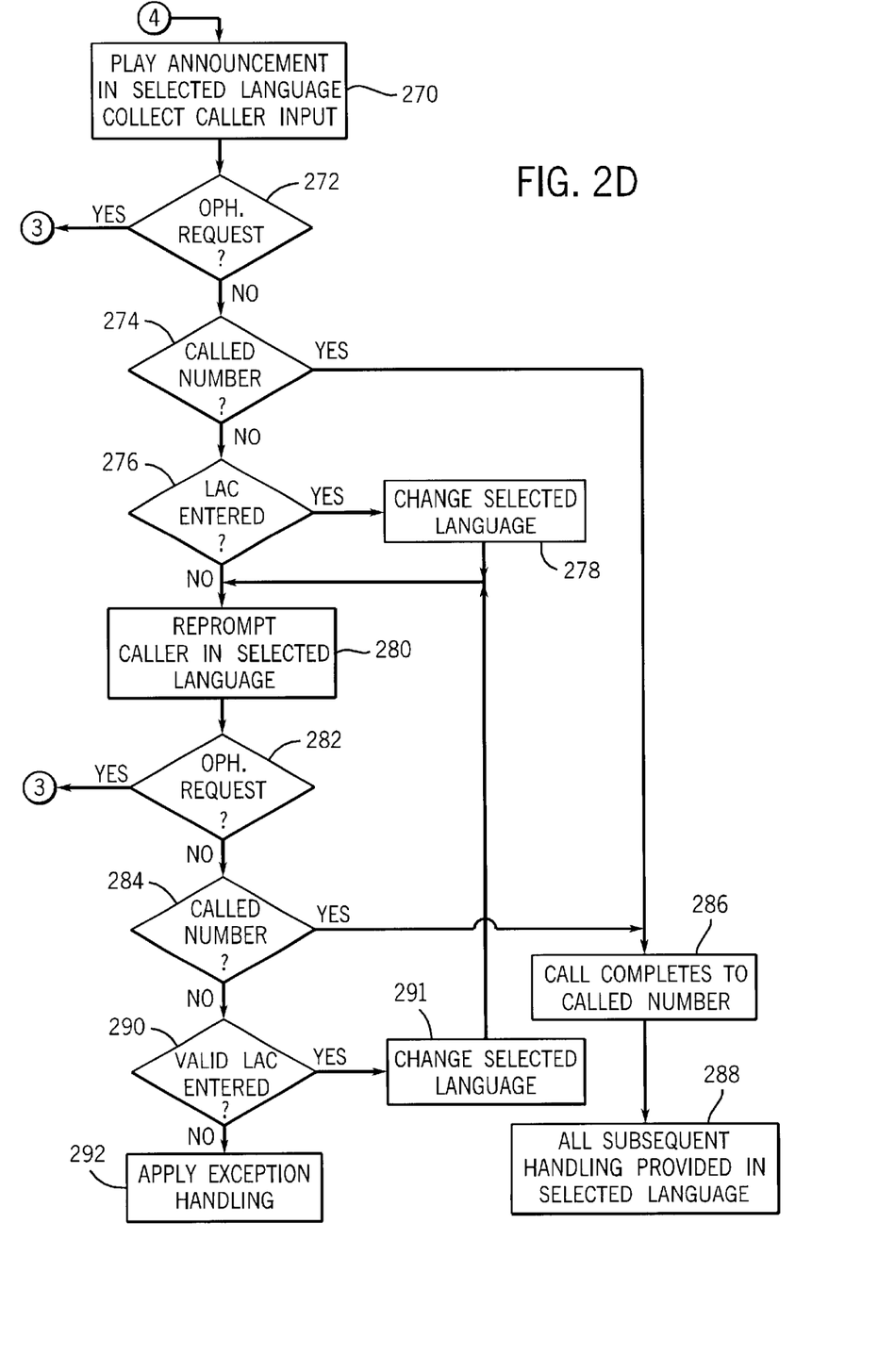

Referring again back to step 250, FIG. 2C, if the code control is set, then the processing proceeds to step 270, FIG. 2D in which an automated operator service announcement is played to the user in the selected language. Caller information from the user is collected at the telephonic network switch 14 in response to the playing of the automated prompt announcement. In step 272, FIG. 2D, the OSPS 26 determines whether the user requested live operator handling. If live operator handling for the call was requested, then the processing returns to step 220, FIG. 2B, to initiate the steps for live operator call handling. However, if in step 272, FIG. 2D, the user did not request live operator handling then in step 274, FIG. 2D the OSPS 26 determines whether the telephone number of the destination telephonic unit 20 was called. If the telephone number of the destination telephonic unit was called, then in step 286, FIG. 2D, the telephonic call is routed to the identified destination telephonic unit 20. All subsequent handling of the telephonic call is identified to be serviced in the assigned language as seen in step 288, FIG. 2D.

Referring now to step 274, FIG. 2D, if a telephone number has not been provided by the caller then in step 276, FIG. 2D, the OSPS 26 determines whether a language access code was entered by the caller. If the user did not enter a language access code, then in step 280, FIG. 2D, the automated operator service announcement is replayed in the assigned language. For example, a prompt message such as "Please enter the number you are calling now or 0 for operator" may be selectively played. If in step 276, FIG. 2D, it is determined that the user entered a language access code, then in step 278, FIG. 2D, the assigned language of the telephonic call is changed to the corresponding language of the entered language access code. Then in step 280, FIG. 2D the automated operator service announcement is replayed in the newly assigned language.

In step 282, FIG. 2D, the OSPS 26 determines whether the user requested live operator handling. If live operator handling was requested, then the telephonic call is routed to step 220, FIG. 2B. If the OSPS 26 determines in step 282, FIG. 2D, that the user did not request live operator handling then in step 284, FIG. 2D, the OSPS 26 determines whether the telephone number of the destination telephonic unit 20 has been called. If the telephone number has been called, then in step 286, FIG. 2D, the telephonic call is routed to the identified destination telephonic unit 20. All subsequent handling of the telephonic call is provided in the assigned selected language as seen in step 288, FIG. D.

Referring back again to step 284, FIG. 2D, if the OSPS 26 determines that the telephone number of the destination telephonic unit 20 has not been called then in step 290, FIG. 2D the OSPS 26, FIG. 1, determines whether a valid language access code was entered by the user. If the user entered a valid language access code, then in step 291 the assigned language of the telephonic call is changed to the corresponding language of the entered language access code and the processing returns to step 280, FIG. 2D, to reprompt the caller in the appropriate selected language. If it is determined in step 290, FIG. 2D, that an invalid language access code was entered, then in step 292 exception handling is applied to the telephonic call.

While a detailed description of the preferred embodiments of the invention has been given, it should be appreciated that many variations can be made thereto without departing from the scope of the invention as set forth in the appended claims.

What is claimed is:

1. A method comprising the steps of:
sending a call, directed to a called party and originated by a calling party, to a public telephone network;
assigning a language to the call by a device that is part of the public telephone network,
wherein language assignment and operator services are internal programmed functions of a switch that originated the call in the public telephone network.

2. The method of claim 1, wherein operator services are enabled to be provided in the assigned language throughout the duration of the call.

3. The method of claim 1, wherein the assigned language is utilized for public telephone network interaction with the calling party and the called party.

4. The method of claim 1, wherein subsequent handling of the telephone call by the public telephone network is serviced in the assigned language.

5. The method of claim 1, further comprising the steps of:
determining whether a communications device, serving the call as part of the public telephone network, has available resources in the assigned language;
when the communications device does not have available resources in the assigned language, utilizing an alternate communications device to provide operator services for the call in the assigned language.

6. A method comprising the steps of:
sending a call, directed to a called party and originated by a calling party, to a public telephone network;
automatically assigning a language to the call at the public telephone network without interaction with the calling party;
wherein language assignment and operator services are internal programmed functions of a switch that originated the call in the public telephone network.

7. The method of claim 6, wherein operator services are enabled to be provided in the assigned language throughout the duration of the call.

8. The method of claim 6, wherein the assigned language is utilized for public telephone network interaction with the calling party and the called party.

9. The method of claim 6, wherein subsequent handling of the telephone call by the public telephone network is serviced in the assigned language.

10. The method of claim 6, further comprising the steps of:
determining whether a communications device, serving the call as part of the public telephone network, has available resources in the assigned language;
when the communications device does not have available resources in the assigned language, utilizing an alternate communications device to provide operator services for the call in the assigned language, while maintaining call processing for the call at the switch that originated the call in the public telephone network.

11. A communication system comprising:
means for sending a call from an initial telephone unit to a public telephone network;
means, at the public telephone network, for assigning a language to the call such that the assigned language is an associated attribute for the call; and
means for identifying the call to receive telephone operator services in the language assigned to the call;
wherein language assignment and operator services are internal programmed functions of a switch that originated the call in the public telephone network.

12. The communications system of claim 11, wherein the assigned language is utilized for public telephone network interaction with the calling party and the called party.

13. The communications system of claim 11, wherein subsequent handling of the telephone call by the public telephone network is serviced in the assigned language.

14. The communications system of claim 11, further comprising the steps of:
determining whether a communications device, serving the call as part of the public telephone network, has available resources in the assigned language;
when the communications device does not have available resources in the assigned language, utilizing an alternate communications device to provide operator services for the call in the assigned language.

* * * * *